United States Patent
Endo et al.

(10) Patent No.: US 10,652,158 B2
(45) Date of Patent: May 12, 2020

(54) WIRED/WIRELESS COMPOSITE COMMUNICATION SYSTEM AND WIRED/WIRELESS COMPOSITE COMMUNICATION METHOD

(71) Applicant: Yazaki Corporation, Tokyo (JP)

(72) Inventors: Takashi Endo, Shizuoka (JP); You Yanagida, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 22 days.

(21) Appl. No.: 16/114,868

(22) Filed: Aug. 28, 2018

(65) Prior Publication Data

US 2019/0068510 A1  Feb. 28, 2019

(30) Foreign Application Priority Data

Aug. 30, 2017  (JP) .................................. 2017-166077

(51) Int. Cl.
| | |
|---|---|
| *H04L 12/28* | (2006.01) |
| *H04L 12/857* | (2013.01) |
| *H04L 12/915* | (2013.01) |
| *H04L 12/801* | (2013.01) |
| *H04L 12/851* | (2013.01) |
| *H04J 1/16* | (2006.01) |

(52) U.S. Cl.
CPC .......... *H04L 47/2491* (2013.01); *H04L 47/14* (2013.01); *H04L 47/2433* (2013.01); *H04L 47/785* (2013.01)

(58) Field of Classification Search
CPC . H04L 12/4015; H04L 47/14; H04L 47/2433; H04L 67/12; H04W 72/10
USPC ......................................... 370/252, 329, 230
See application file for complete search history.

(56) References Cited

U.S. PATENT DOCUMENTS

| | | | |
|---|---|---|---|
| 2014/0280706 A1* | 9/2014 | Jain ......................... | H04L 67/06 709/217 |
| 2017/0257227 A1* | 9/2017 | Endo .................... | H04L 12/4015 |

FOREIGN PATENT DOCUMENTS

JP       2015-162795 A       9/2015

\* cited by examiner

*Primary Examiner* — John Pezzlo
(74) *Attorney, Agent, or Firm* — Sughrue Mion, PLLC

(57) ABSTRACT

A wired/wireless composite communication system and a wired/wireless composite communication method perform control to use wired communication for communication data having high priority and to use wireless communication for communication data having low priority among the types of communication data transmitted and received between communication devices provided within a vehicle. Specifically, the wired/wireless composite communication system and the wired/wireless composite communication method transmit wired communication data and wireless communication data divided on the basis of the priority set for each type of the communication data separately by wired communication and wireless communication, and couple the wired communication data and the wireless communication data separately received on a reception side to each other to reconstruct the communication data.

12 Claims, 7 Drawing Sheets

FIG.5

| ID | COMMUNICATION DATA TYPE |
|---|---|
| 0 | AIRBAG |
| 1 | BRAKE |
| 2 | . |
| 3 | . |
| 4 | . |
| 5 | . |
| 6 | . |

WIRED: 0–3
WIRELESS: 4–6
PRIORITY 108a, 208a

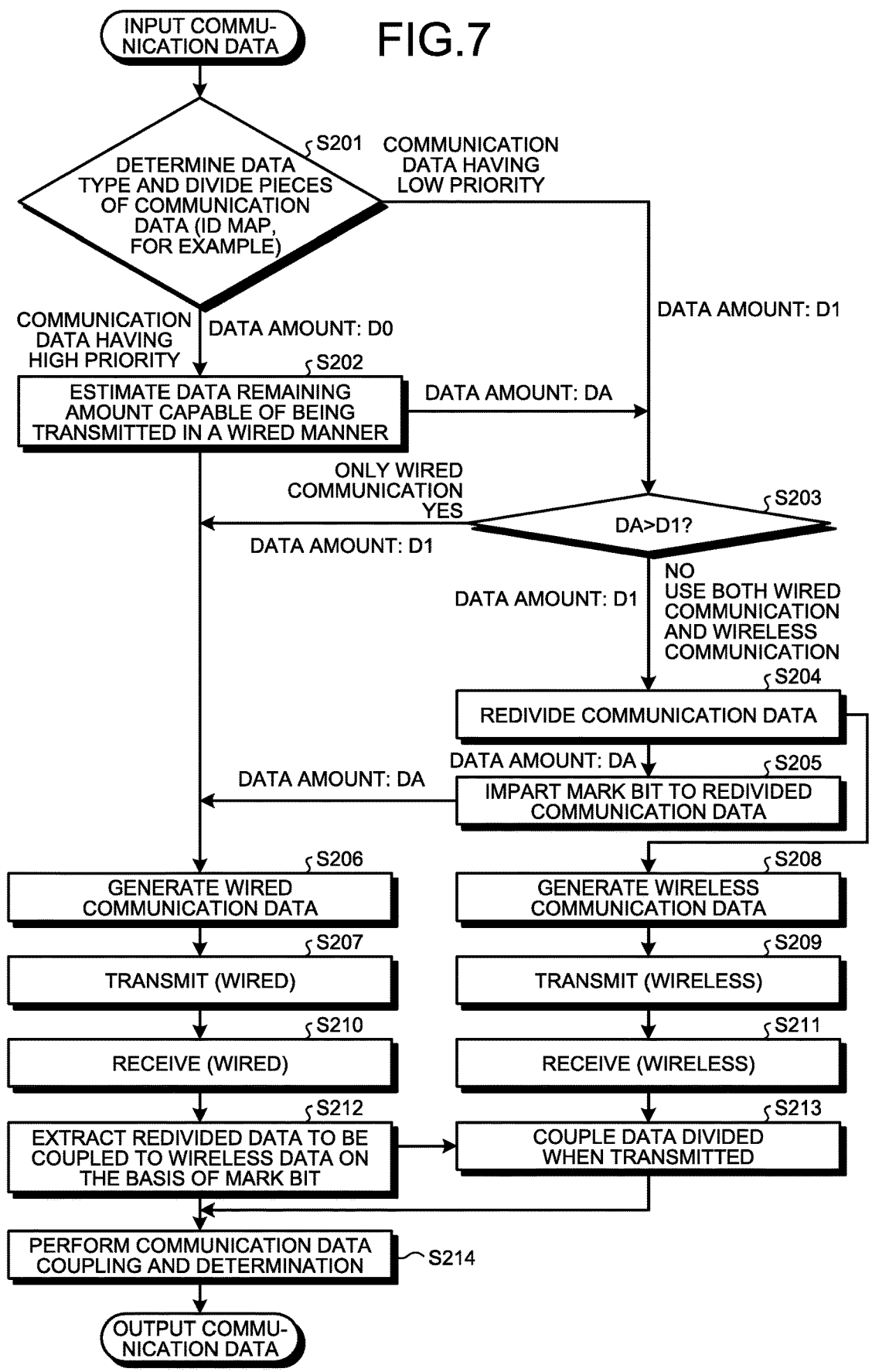

WIRED/WIRELESS COMPOSITE COMMUNICATION SYSTEM AND WIRED/WIRELESS COMPOSITE COMMUNICATION METHOD

CROSS-REFERENCE TO RELATED APPLICATION(S)

The present application claims priority to and incorporates by reference the entire contents of Japanese Patent Application No. 2017-166077 filed in Japan on Aug. 30, 2017.

BACKGROUND OF THE INVENTION

1. Field of the Invention

The present invention relates to a wired/wireless composite communication system and a wired/wireless composite communication method.

2. Description of the Related Art

In in-vehicle systems, various pieces of communication data have been conventionally transmitted and received between communication devices, and these pieces of communication data have been transmitted and received by wired communication via communication lines connecting the communication devices or have been transmitted and received by wireless communication without any communication lines (Japanese Patent Application Laid-open No. 2015-162795 and the like).

When communication data is transmitted and received between communication devices provided within a vehicle, although using wired communication improves the reliability of data communication compared with wireless communication, there is a problem in that connecting all the communication devices provided within the vehicle with expensive communication lines enabling large-capacity data communication increases costs. In contrast, placing more importance on costs and using wireless communication heavily leaves the problem of reliability of data communication. Conventional techniques have room for further improvement in these points.

SUMMARY OF THE INVENTION

The present invention has been made in view of the above, and an object thereof is to provide a wired/wireless composite communication system and a wired/wireless composite communication method that can appropriately transmit and receive various pieces of communication data between communication devices provided within a vehicle by wired/wireless composite communication.

In order to solve the above mentioned problem and achieve the object, a wired/wireless composite communication system according to one aspect of the present invention includes a first communication device including a controller, a storage unit, a first wired communication interface unit, and a first wireless communication interface unit; and a second communication device communicably connected to the first communication device in a wired manner and a wireless manner and including a controller, a storage unit, a second wired communication interface unit, and a second wireless communication interface unit, a communication in the wired manner including an electric communication by an electric signal and an optical communication by an optical signal, wherein the storage unit of the first communication device and the storage unit of the second communication device each includes a data priority information storage unit that stores therein data priority information that sets priority for each type of communication data transmitted and received between the first communication device and the second communication device provided within a vehicle, the controller of the first communication device includes: a data type determination unit that determines a type of the communication data to be transmitted from the first communication device to the second communication device; a transmission data priority identification unit that identifies the priority corresponding to the type of the communication data determined by the data type determination unit by referring to the data priority information stored in the data priority information storage unit of the first communication device; a data division unit that, on the basis of the priority identified by the transmission data priority identification unit, divides pieces of communication data into communication data having high priority and communication data having low priority; a wired communication data generation unit that generates the communication data having high priority divided by the data division unit as wired communication data communicable in the wired manner; a wired transmission controller that transmits the wired communication data generated by the wired communication data generation unit to the second communication device via the first wired communication interface unit; a wireless communication data generation unit that generates the communication data having low priority divided by the data division unit as wireless communication data communicable in the wireless manner; and a wireless transmission controller that transmits the wireless communication data generated by the wireless communication data generation unit to the second communication device via the first wireless communication interface unit, and the controller of the second communication device includes: a wired reception controller that receives the wired communication data transmitted by the wired transmission controller from the first communication device via the second wired communication interface unit; a wireless reception controller that receives the wireless communication data transmitted by the wireless transmission controller from the first communication device via the second wireless communication interface unit; a reception data priority identification unit that identifies the priority corresponding to each of the wired communication data received by the wired reception controller and the wireless communication data received by the wireless reception controller by referring to the data priority information stored in the data priority information storage unit of the second communication device; and a data coupling unit that, on the basis of the priority of the wired communication data and the priority of the wireless communication data identified by the reception data priority identification unit, couples the wired communication data and the wireless communication data to each other to reconstruct the communication data.

According to another aspect of the present invention, in the wired/wireless composite communication system, it is preferable that the controller of the first communication device further includes: a data remaining amount prediction unit that predicts a data remaining amount capable of being transmitted to the second communication device via the first wired communication interface unit on the basis of a data amount of the communication data having high priority divided by the data division unit; and a data amount determination unit that determines whether a data amount of the communication data having low priority divided by the data division unit is smaller than the data remaining amount predicted by the data remaining amount prediction unit, and when it is determined by the data amount determination unit that the data amount of the communication data having low priority is smaller than the data remaining amount predicted by the data remaining amount prediction unit, the wired communication data generation unit generates both the communication data having high priority and the communication data having low priority divided by the data division unit as the wired communication data.

According to still another aspect of the present invention, in the wired/wireless composite communication system, it is preferable that when it is determined by the data amount determination unit that the data amount of the communication data having low priority is the data remaining amount predicted by the data remaining amount prediction unit or larger, the data division unit redivides the communication data having low priority so as to contain part of the communication data having low priority in addition to the communication data having high priority until a data amount corresponding to the data remaining amount is reached, the wired communication data generation unit adds the part of the communication data having low priority redivided by the data division unit to the communication data having high priority to be generated as the wired communication data, and the wireless communication data generation unit generates the rest of the communication data having low priority not added to the communication data having high priority when redivided by the data division unit as the wireless communication data.

According to still another aspect of the present invention, in the wired/wireless composite communication system, it is preferable that the wired transmission controller transmits the wired communication data generated by the wired communication data generation unit to the second communication device by the electric communication by the electric signal or the optical communication by the optical signal via the first wired communication interface unit in accordance with the type of the communication data determined by the data type determination unit or the priority identified by the transmission data priority identification unit.

In order to solve the above mentioned problem and achieve the object, a wired/wireless composite communication method according to still another aspect of the present invention is executed by a wired/wireless composite communication system including a first communication device including a controller, a storage unit, a first wired communication interface unit and a first wireless communication interface unit, and a second communication device communicably connected to the first communication device in a wired manner and a wireless manner and including a controller, a storage unit, a second wired communication interface unit and a second wireless communication interface unit, a communication in the wired manner including an electric communication by an electric signal and an optical communication by an optical signal, the storage unit of the first communication device and the storage unit of the second communication device each including a data priority information storage unit that stores therein data priority information that sets priority for each type of communication data transmitted and received between the first communication device and the second communication device provided within a vehicle.

The wired/wireless composite communication method includes a data type determination step of determining a type of the communication data to be transmitted from the first communication device to the second communication device, executed by the controller of the first communication device; a transmission data priority identification step of identifying the priority corresponding to the type of the communication data determined at the data type determination step by referring to the data priority information stored in the data priority information storage unit of the first communication device, executed by the controller of the first communication device; a data division step of, on the basis of the priority identified at the transmission data priority identification step, dividing pieces of communication data into communication data having high priority and communication data having low priority, executed by the controller of the first communication device; a wired communication data generation step of generating the communication data having high priority divided at the data division step as wired communication data communicable in the wired manner, executed by the controller of the first communication device; a wireless communication data generation step of generating the communication data having low priority divided at the data division step as wireless communication data communicable in the wireless manner, executed by the controller of the first communication device; a wired transmission control step of transmitting the wired communication data generated at the wired communication data generation step to the second communication device via the first wired communication interface unit, executed by the controller of the first communication device; a wired reception control step of receiving the wired communication data transmitted at the wired transmission control step from the first communication device via the second wired communication interface unit, executed by the controller of the second communication device; a wireless transmission control step of transmitting the wireless communication data generated at the wireless communication data generation step to the second communication device via the first wireless communication interface unit, executed by the controller of the first communication device; a wireless reception control step of receiving the wireless communication data transmitted at the wireless transmission control step from the first communication device via the second wireless communication interface unit, executed by the controller of the second communication device; a reception data priority identification step of identifying the priority corresponding to each of the wired communication data received at the wired reception control step and the wireless communication data received at the wireless reception control step by referring to the data priority information stored in the data priority information storage unit of the second communication device, executed by the controller of the second communication device; and a data coupling step of, on the basis of the priority of the wired communication data and the priority of the wireless communication data identified at the reception data priority identification step, coupling the wired communication data and the wireless communication data to each other to reconstruct the communication data.

According to still another aspect of the present invention, in the wired/wireless composite communication method, it is preferable to further include a data remaining amount prediction step of predicting a data remaining amount capable of being transmitted to the second communication device via the first wired communication interface unit on the basis of a data amount of the communication data having high priority divided at the data division step, executed by the controller of the first communication device; and a data amount determination step of determining whether a data amount of the communication data having low priority divided at the data division step is smaller than the data remaining amount predicted at the data remaining amount prediction step, executed by the controller of the first communication device, wherein at the wired communication data generation step, when it is determined, at the data amount determination step, that a data amount of the communication data having low priority is smaller than the data remaining amount predicted at the data remaining amount prediction step, both the communication data having high priority and the communication data having low priority divided at the data division step are generated as the wired communication data.

According to still another aspect of the present invention, in the wired/wireless composite communication method, it is preferable that at the data division step, when it is determined, at the data amount determination step, that the data amount of the communication data having low priority is the data remaining amount predicted at the data remaining amount prediction step or larger, the communication data having low priority is redivided so as to contain part of the communication data having low priority in addition to the communication data having high priority until a data amount corresponding to the data remaining amount is reached, at the wired communication data generation step, the part of the communication data having low priority redivided at the data division step is added to the communication data having high priority to be generated as the wired communication data, and at the wireless communication data generation step, the rest of the communication data having low priority not added to the communication data having high priority when redivided at the data division step is generated as the wireless communication data.

According to still another aspect of the present invention, in the wired/wireless composite communication method, it is preferable that at the wired transmission control step, the wired communication data generated at the wired communication data generation step is transmitted to the second communication device by the electric communication by the electric signal or the optical communication by the optical signal via the first wired communication interface unit in accordance with the type of the communication data determined at the data type determination step or the priority identified at the transmission data priority identification step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a data priority information storage unit according to the embodiment;

FIG. 7 is a flowchart illustrating another example of the processing by the wired/wireless composite communication system according to the embodiment.

DETAILED DESCRIPTION OF THE PREFERRED EMBODIMENTS

The following describes a mode for performing the present invention (an embodiment) in detail with reference to the accompanying drawings. The details described in the following embodiment do not limit the present invention. The following components include ones that those skilled in the art can easily think of and substantially the same ones. The following configurations can be combined with each other as appropriate. Various omissions, replacements, and alternations for the configurations can be made without departing from the gist of the present invention.

Embodiment

Figure 1:
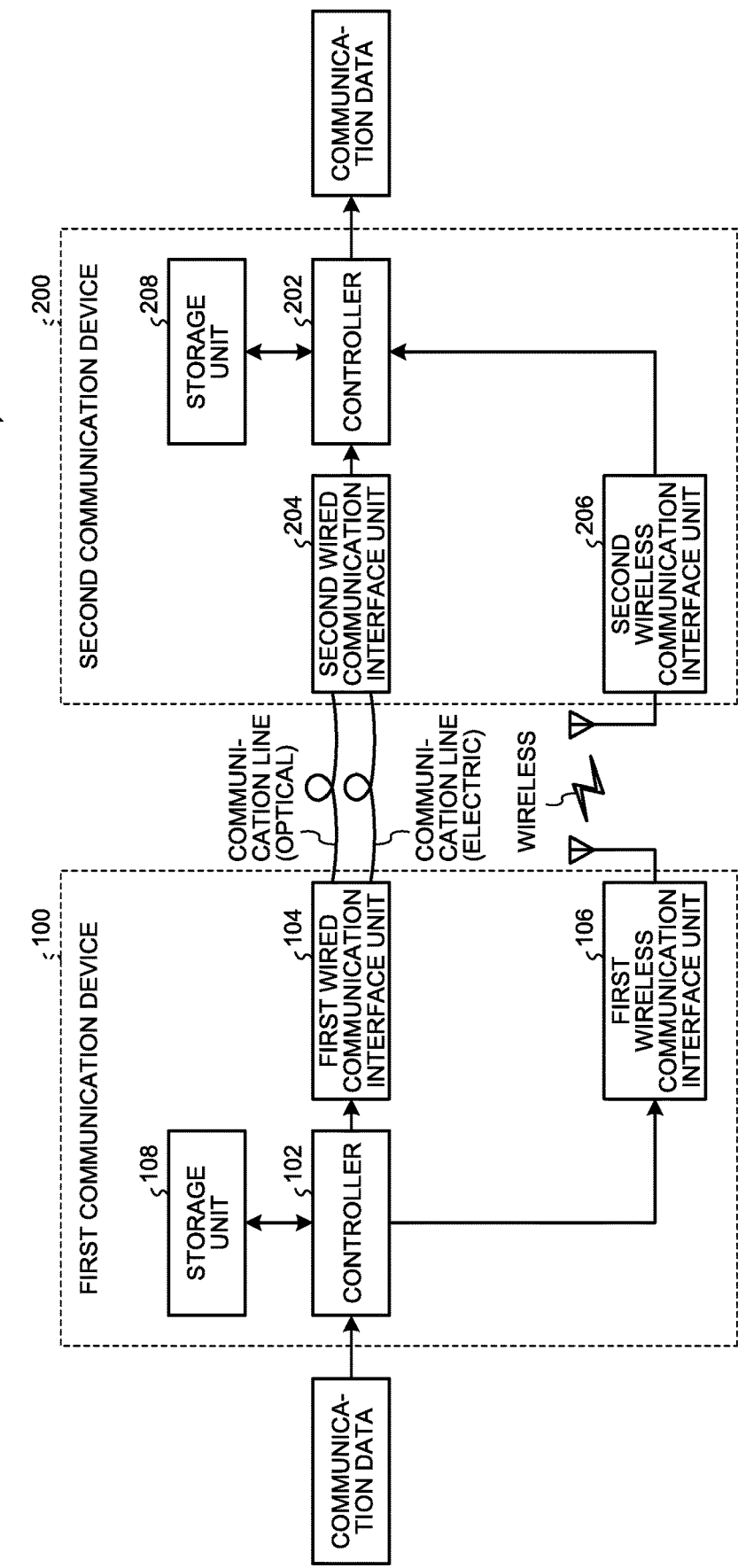
FIG. 1 is a schematic diagram of a wired/wireless composite communication system according to an embodiment.
Figure 2:
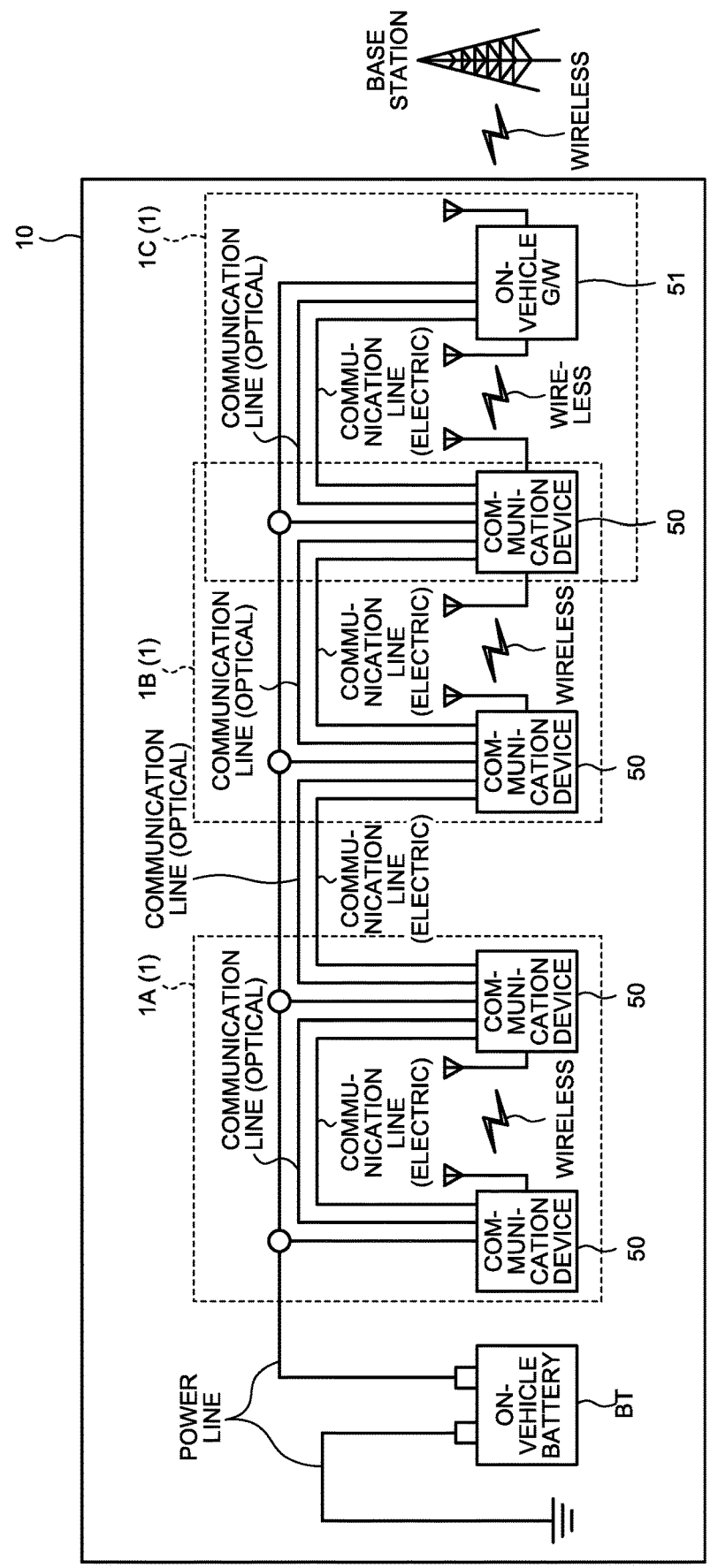
FIG. 2 is an illustrative diagram illustrating an example of the wired/wireless composite communication system according to the embodiment within a vehicle.
Figure 3:
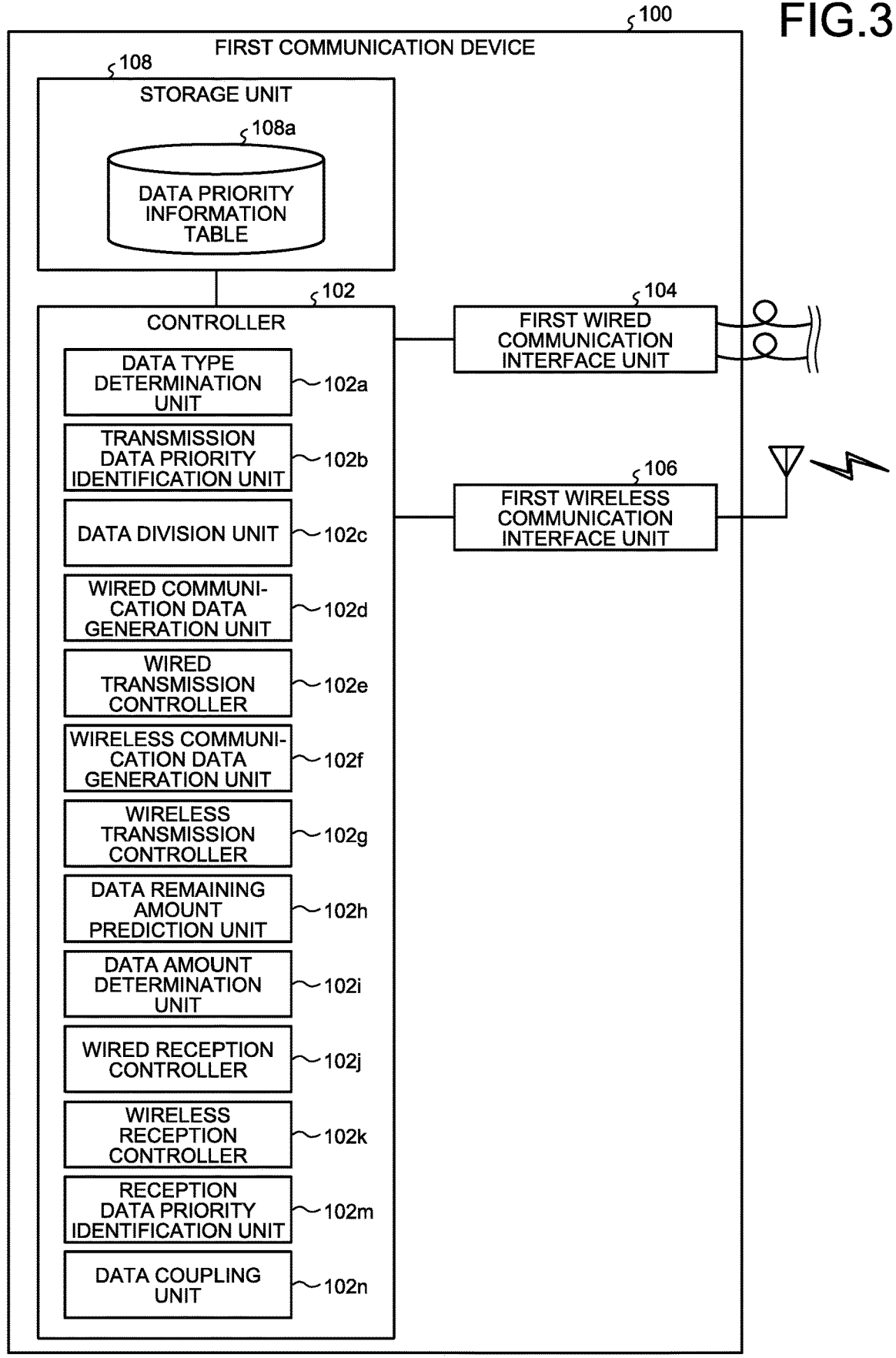
FIG. 3 is a functional configuration diagram illustrating the details of a first communication device according to the embodiment.
Figure 4:
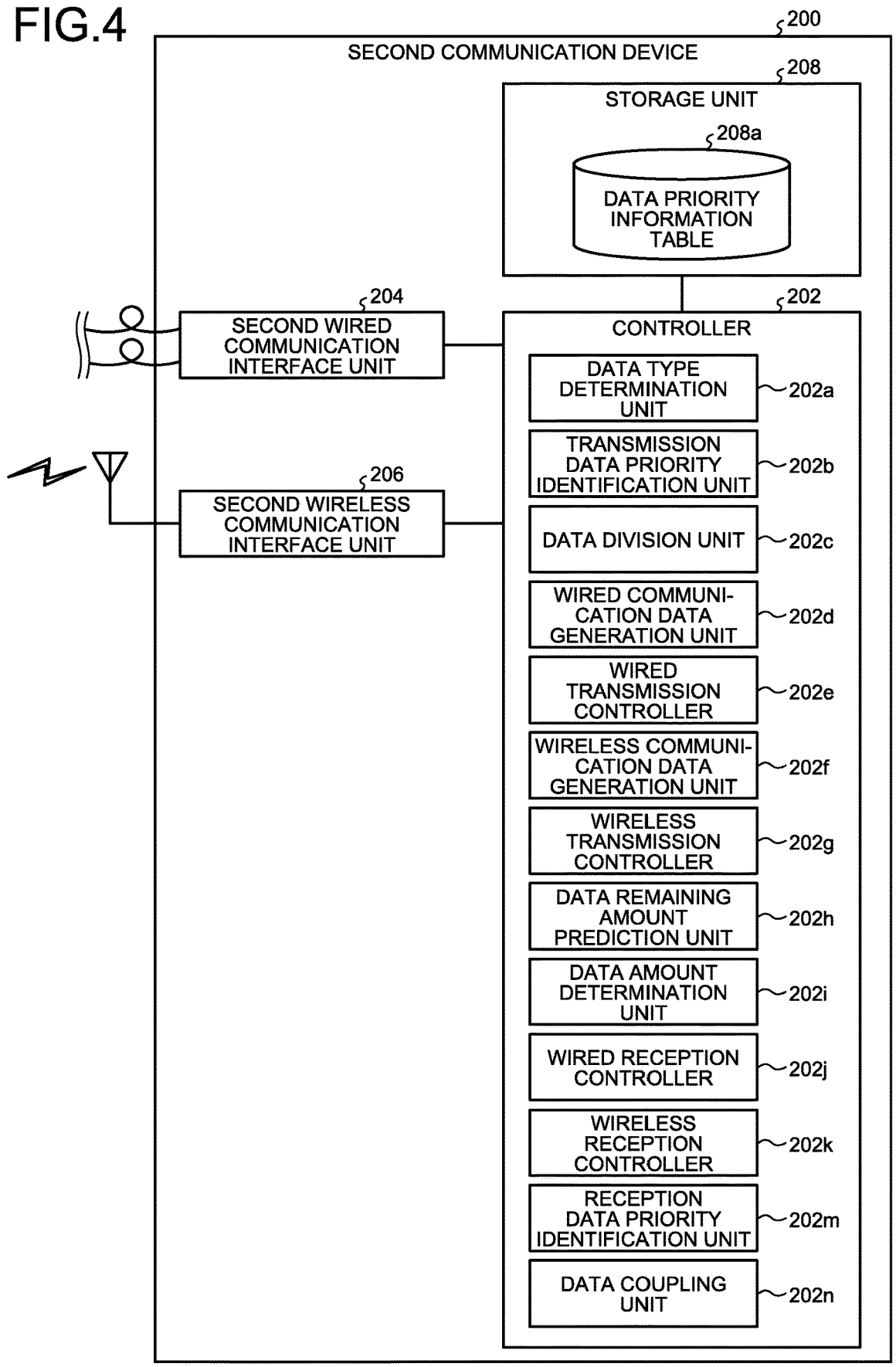
FIG. 4 is a functional configuration diagram illustrating the details of a second communication device according to the embodiment.
Figure 5:
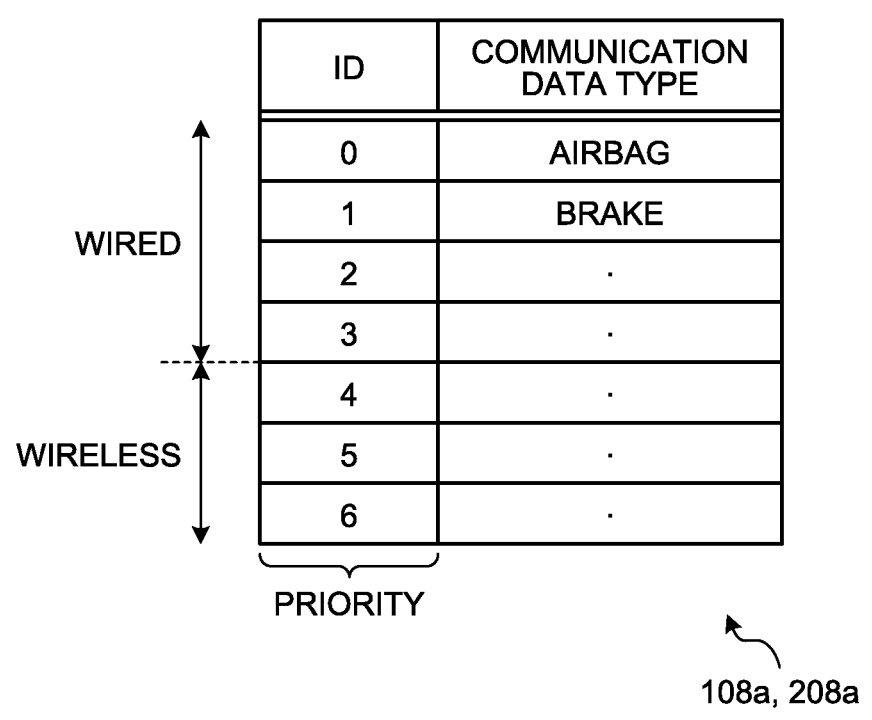
Figure 6:
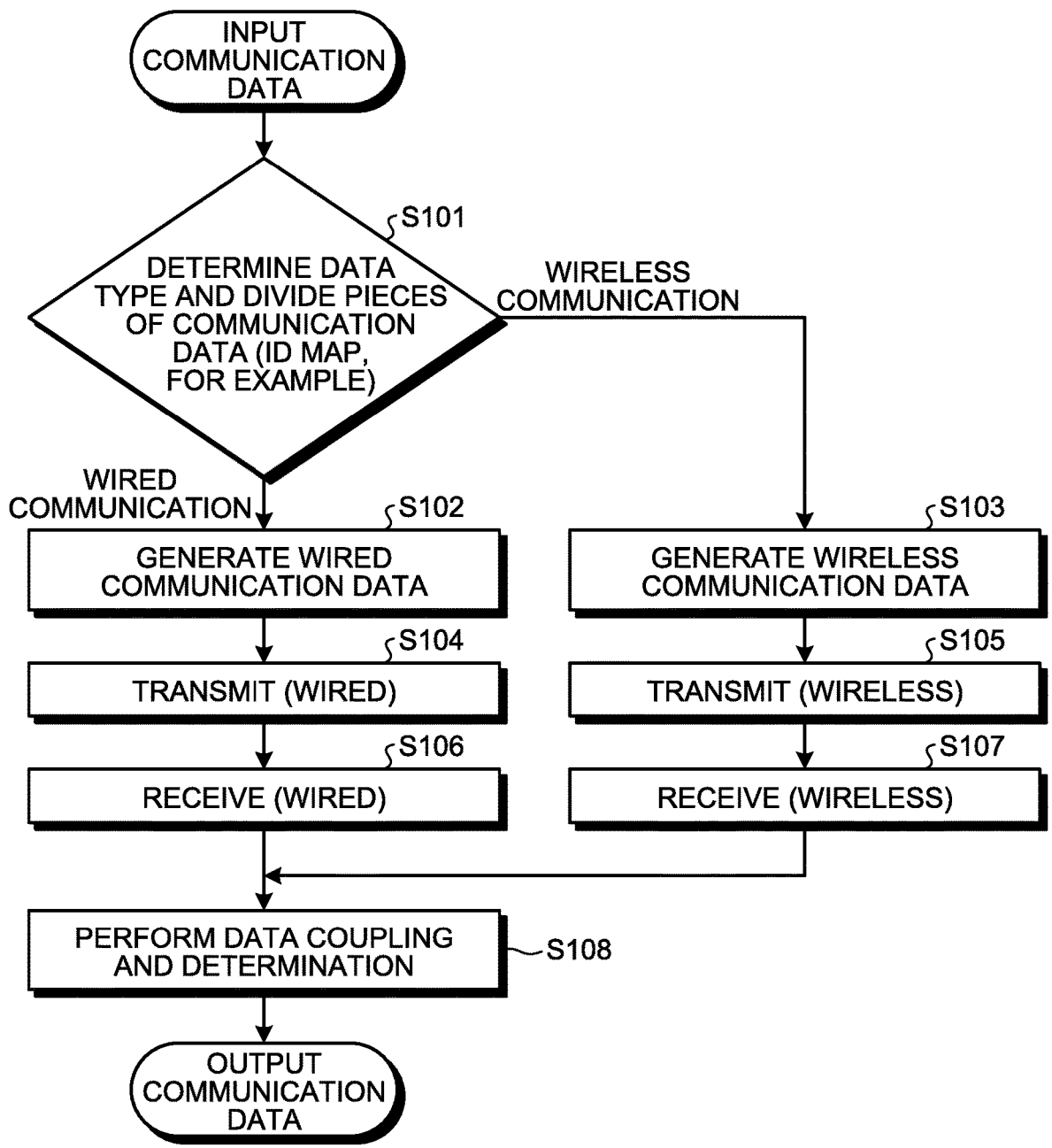
FIG. 6 is a flowchart illustrating basic processing by the wired/wireless composite communication system according to the embodiment.

The following describes a wired/wireless composite communication system and a wired/wireless composite communication method according to the embodiment. FIG. 1 is a schematic diagram of a wired/wireless composite communication system according to the embodiment. FIG. 2 is an illustrative diagram illustrating an example of the wired/wireless composite communication system according to the embodiment within a vehicle. FIG. 3 is a functional configuration diagram illustrating the details of a first communication device according to the embodiment. FIG. 4 is a functional configuration diagram illustrating the details of a second communication device according to the embodiment. FIG. 5 is a diagram illustrating an example of a data priority information storage unit according to the embodiment. FIG. 6 is a flowchart illustrating basic processing by the wired/wireless composite communication system according to the embodiment. FIG. 7 is a flowchart illustrating another example of the processing by the wired/wireless composite communication system according to the embodiment.

As illustrated in FIG. 1, a wired/wireless composite communication system 1 according to the embodiment includes a plurality of communication devices (a first communication device 100 and a second communication device 200, for example). Although the following describes the first communication device 100 as a transmission-side communication device for communication data, whereas the second communication device 200 as a reception-side communication device for the communication data for the convenience of description, this is not limiting; as to the first communication device 100 and the second communication device 200, the first communication device 100 can be the reception-side communication device for the communication data, whereas the second communication device 200 can be the transmission-side communication device for the communication data depending on the situation. In the following, the first communication device 100 and the second communication device 200 may be simply referred to as communication devices 50 without discriminating between them. These communication devices 50 are configured integrally with various kinds of units, various kinds of sensors, and the like installed in a vehicle 10 or provided separately connected thereto, for example.

As illustrated in FIG. 2, the wired/wireless composite communication system 1 according to the embodiment functions as a communication system that can achieve both the function of communicating communication data transmitted and received among the communication devices 50 provided within the vehicle 10 in a wired manner via communication lines and the function of communicating the communication data in a wireless manner via antennae. As an example, in FIG. 2, a wired/wireless composite communication system 1A functions as a communication system that enables wired communication and wireless communication between front sensors of the vehicle 10. In FIG. 2, a wired/wireless composite communication system 1B functions as a communication system that enables wired communication and wireless communication between rear sensors of the vehicle 10. In FIG. 2, a wired/wireless composite communication system 1C functions as a communication system that enables wired communication and wireless communication between an on-vehicle gateway (on-vehicle GW) unit 51 that enables communication with a base station outside the vehicle 10 and inter-vehicle communication with another vehicle and the communication device 50. The on-vehicle gateway unit 51 has the function of communicating with communication devices outside the vehicle by wide area wireless communication and narrow area wireless communication; this on-vehicle gateway unit 51 is an embodiment of the communication device 50 of the present embodiment. Examples of the system of the wide area wireless communication include the radio (AM and FM), the television (TV) (UHF, 4K, and 8K), telephone (TEL), Global Positioning System (GPS), and Worldwide Interoperability for Microwave Access (WiMAX) (registered trademark), and inter-vehicle communication. Examples of the system of the narrow area wireless communication include electronic toll collection/dedicated short range communication (ETC/DSRC), Vehicle Information and Communication System (VICS) (registered trademark), wireless local area network (LAN), and millimeter wave communication. In FIG. 2, the communication devices 50 and the on-vehicle gateway unit 51 provided within the vehicle 10 are each connected to an on-vehicle battery BT via a power line to be supplied with power. This power line may enable power line communication (PLC).

Referring back to FIG. 1, the first communication device 100 includes a controller 102, a first wired communication interface unit 104, a first wireless communication interface unit 106, and a storage unit 108. Similarly, the second communication device 200 includes a controller 202, a second wired communication interface unit 204, a second wireless communication interface unit 206, and a storage unit 208.

In FIG. 1, the controller 102 and the controller 202 are control means that perform various kinds of processing. The controller 102 of the first communication device 100 determines whether input communication data will be transmitted to the second communication device 200 by wired communication and/or will be transmitted to the second communication device 200 by wireless communication on the basis of information stored in the storage unit 108. When the communication data is transmitted by wired communication, the controller 102 controls the first wired communication interface unit 104 to transmit the data to the second wired communication interface unit 204 connected via a communication line. When the communication data is transmitted by wireless communication, the controller 102 controls the first wireless communication interface unit 106 to transmit the communication data to the second wireless communication interface unit 206 connected in a wirelessly communicable manner via antennae. The controller 202 of the second communication device 200 controls the second wired communication interface unit 204 to receive the communication data transmitted from the first communication device 100 by wired communication. The controller 202 controls the second wireless communication interface unit 206 to receive the communication data transmitted from the first communication device 100 by wireless communication. The controller 202, on the basis of information stored in the storage unit 208, couples the communication data received by wired communication and the communication data received by wireless communication to each other. Subsequently, the controller 202 outputs the coupled communication data. The details of the functions of the controller 102 and the controller 202 will be described below with reference to FIG. 3 and FIG. 4.

The first wired communication interface unit 104 and the second wired communication interface unit 204 are interfaces connected to communication lines and have the function of performing communication control in a wired manner between the first communication device 100 and the second communication device 200. In other words, the first wired communication interface unit 104 and the second wired communication interface unit 204 have the function of communicating data in a wired manner via the communication lines. In the embodiment, the communication lines that physically connect the first wired communication interface unit 104 and the second wired communication interface unit 204 include an electric communication line transmitting electric signals and an optical communication line transmitting optical signals. With this configuration, in the embodiment, communication in a wired manner, that is, wired communication includes electric communication by an electric signal and optical communication by an optical signal. Examples of the communication lines include, but are not limited to, LAN cables and exclusive communication lines such as controller area network (CAN). In addition, when the power line enables power line communication (PLC), the first wired communication interface unit 104 and the second wired communication interface unit 204 may function as interfaces connected to the power line. Although the following describes an example in which one first wired communication interface unit 104 and one second wired communication interface unit 204 are provided in the first communication device 100 and the second communication device 200, respectively, this is not limiting; a plurality of first wired communication interface units 104 and a plurality of second wired communication interface units 204 may be provided in the first communication device 100 and the second communication device 200, respectively.

In the embodiment, the power line and the communication lines described above are prepared as a wire harness routed within the vehicle 10. The wire harness of the embodiment bundles connecting lines such as a plurality of electric wires and communication lines used for power supply and signal communication to make an assembled component and connects the connecting lines to each of the devices via a connector at once in order to connect the devices installed in the vehicle 10, for example.

The first wireless communication interface unit 106 and the second wireless communication interface unit 206 are interfaces having respective antennae enabling wireless communication by various communication protocols and have the function of performing communication control in a wireless manner between the first communication device 100 and the second communication device 200. In other words, the first wireless communication interface unit 106 and the second wireless communication interface unit 206 have the function of wirelessly communicating data via the antennae. The first wireless communication interface unit 106 and the second wireless communication interface unit 206 have the function of performing short-distance wireless communication such as wireless LAN, Wi-Fi (registered trademark), Bluetooth (registered trademark), and Near Field Communication (NFC), but examples are not limited to these. Although the following describes an example in which one first wireless communication interface unit 106 and one second wireless communication interface unit 206 are provided in the first communication device 100 and the second communication device 200, respectively, this is not limiting; a plurality of first wireless communication interface units 106 and a plurality of second wireless communication interface units 206 may be provided in the first communication device 100 and the second communication device 200, respectively.

The storage unit 108 and the storage unit 208 are storage means such as large-capacity storage means such as a hard disk drive (HDD) and a solid state drive (SSD) and/or small-capacity high-speed memories including a static random access memory (SRAM) (a cash memory, for example) and may store therein various kinds of databases, files, tables (a data priority information table 108a, a data priority information table 208a, and the like). The storage unit 108 and the storage unit 208 may store therein various kinds of files and the like temporarily. The details of the data priority information table 108a of the storage unit 108 and the data priority information table 208a of the storage unit 208 will be described below with reference to FIG. 5.

The following describes the details of the controller 102 of the first communication device 100 with reference to FIG. 3. In FIG. 3, the controller 102 includes a data type determination unit 102a, a transmission data priority identification unit 102b, a data division unit 102c, a wired communication data generation unit 102d, a wired transmission controller 102e, a wireless communication data generation unit 102f, a wireless transmission controller 102g, a data remaining amount prediction unit 102h, a data amount determination unit 102i, a wired reception controller 102j, a wireless reception controller 102k, a reception data priority identification unit 102m, and a data coupling unit 102n.

Among them, the data type determination unit 102a determines the type of communication data to be transmitted from the first communication device 100 to the second communication device 200. The transmission data priority identification unit 102b refers to data priority information stored in the data priority information table 108a (refer to FIG. 5) as a data priority information storage unit of the first communication device 100 and identifies priority corresponding to the type of the communication data determined by the data type determination unit 102a.

As illustrated in FIG. 5, the data priority information tables 108a and 208a store therein the data priority information that sets priority for each type of the communication data transmitted and received between the first communication device 100 and the second communication device 200 provided within the vehicle 10. In the example in FIG. 5, the priority is set from "0" to "6" as an ID number. In this example, a smaller ID number has higher priority. For example, in FIG. 5, for communication data including various kinds of information such as signals and instructions about an airbag, which has a high priority, an ID number of "0" is set. In FIG. 5, for communication data including various kinds of information such as signals and instructions about a brake, an ID number of "1" is set. The data priority information tables 108a and 208a may define that data communication by wired communication is performed for ID numbers of "0" to "3," which have high priority. Further, the data priority information tables 108a and 208a may define which of the electric communication by an electric signal and the optical communication by an optical signal is preferentially used in accordance with the priority set for each of the types (that is, the ID numbers) of the communication data. In this case, it may be defined so as to perform data communication preferentially using optical communication in a wired manner for communication data having relatively high priority, whereas it may be defined so as to perform data communication preferentially using electric communication in a wired manner for communication data having relatively low priority, for example. The data priority information tables 108a and 208a may define which of the electric communication by an electric signal and the optical communication by an optical signal is preferentially used for each of the types (that is, the ID numbers) defined so as to perform data communication by wired communication. In this case, it may be defined so as to perform data communication preferentially using the electric communication in a wired manner for an ID number corresponding to communication data relatively small in information amount, whereas it may be defined so as to perform data communication preferentially using the optical communication in a wired manner for an ID number corresponding to communication data relatively large in information amount, for example. The data priority information tables 108a and 208a do not necessarily define which of the electric communication by an electric signal and the optical communication by an optical signal is preferentially used for each of the types (that is, the ID numbers) defined so as to perform data communication by wired communication. In this case, the data communication using the electric communication in a wired manner or the data communication using the optical communication in a wired manner may be used as appropriate depending on the situation. It is defined to perform data communication by wireless communication for ID numbers of "4" to "6," which have low priority.

As illustrated in FIG. 5, the communication data about the airbag as a member of a safety-related device group of the vehicle 10 is communication data related to the safety control of the vehicle 10, and the priority thereof is set highest. Examples of the safety-related device group include a yaw rate sensor, the airbag, wheel side sensors, and an autonomous driving electronic control unit (ECU). The communication data about the brake as a member of a power train-related device group of the vehicle 10 is communication data related to vehicle control, and the priority thereof is set second highest next to the safety control. Examples of the power train-related device group include a hybrid controller, a steering sensor, an engine, suspensions, steering by wire, transmission, a battery sensor, and brake by wire.

Although not illustrated in FIG. 5, examples of the type of the communication data include, in addition to the communication data about the safety-related device group (the airbag and the like) and the communication data about the power train-related device group (the brake and the like), respective pieces of communication data about a body-related device group, a multimedia-related device group, a power supply-related device group, a diagnosis-related device group, and a charging-related device group. Examples of the body-related device group include power swing doors, a memory seat, an air conditioner, meters, shift by wire, lighting fixtures, a rear controller, and a power trunk. Examples of the multimedia-related device group include a navigation device, a display, an amplifier, and an external communication unit. Examples of the power supply-related device group include a power supply area master, a power supply area slave, and low-voltage/high-voltage battery packs. Examples of the diagnosis-related device group include a diagnosis tool (a scan tool). Examples of the charging-related device group include a battery charger.

The respective pieces of communication data about the body-related device group, the multimedia-related device group, the power supply-related device group, the diagnosis-related device group, and the charging-related device group can be set to pieces of communication data having lower priority than the communication data about the safety-related device group (the airbag and the like) and the communication data about the power train-related device group (the brake and the like), but the examples are not limited to these. Among the body-related device group, the multimedia-related device group, the power supply-related device group, the diagnosis-related device group, and the charging-related device group, the respective pieces of communication data about the body-related device group and the power supply-related device group can be set to pieces of communication data having higher priority than those about the multimedia-related device group, the diagnosis-related device group, and the charging-related device group.

In the embodiment, when determining the type of the communication data to be transmitted from the first communication device 100 to the second communication device 200, the data type determination unit 102a determines the type of the communication data by classifying pieces of communication data into the communication data about the airbag, the communication data about the brake, and the like, for example. The transmission data priority identification unit 102b, on the basis of the type of the communication data determined by the data type determination unit 102a, identifies the priority to be an ID number of "0" for the communication data about the airbag, for example, and thus identifies the priority corresponding to the type of the communication data.

Referring back to FIG. 3, the data division unit 102c, on the basis of the priority identified by the transmission data priority identification unit 102b, divides pieces of communication data into communication data having high priority and communication data having low priority. In the embodiment, as illustrated in FIG. 5, for example, the data division unit 102c divides the types of the pieces of communication data having the priority with ID numbers of "0" to "3" including the pieces of communication data about the airbag and the brake as the communication data having high priority. The data division unit 102c divides the types of pieces of communication data having the priority with ID numbers of "4" to "6" other than ID numbers of "0" to "3" as the communication data having low priority.

The wired communication data generation unit 102d generates the communication data having high priority divided by the data division unit 102c as wired communication data communicable in a wired manner. The wired transmission controller 102e transmits the wired communication data generated by the wired communication data generation unit 102d to the second communication device 200 via the first wired communication interface unit 104. In this case, the wired transmission controller 102e transmits the wired communication data generated by the wired communication data generation unit 102d to the second communication device 200 by the electric communication by an electric signal or the optical communication by an optical signal via the first wired communication interface unit 104 in accordance with the type of the communication data determined by the data type determination unit 102a, for example. Alternatively, the wired transmission controller 102e may transmit the wired communication data generated by the wired communication data generation unit 102d to the second communication device 200 by the electric communication by an electric signal or the optical communication by an optical signal via the first wired communication interface unit 104 in accordance with the priority identified by the transmission data priority identification unit 102b, for example. The wired transmission controller 102e may transmit the wired communication data generated by the wired communication data generation unit 102d to the second communication device 200 via the first wired communication interface unit 104 by using the data communication using the electric communication in a wired manner or the data communication using the optical communication in a wired manner as appropriate depending on the situation regardless of the type of the communication data, the priority, or the like, for example. The wireless communication data generation unit 102f generates the communication data having low priority divided by the data division unit 102c as wireless communication data communicable in a wireless manner. The wireless transmission controller 102g transmits the wireless communication data generated by the wireless communication data generation unit 102f to the second communication device 200 via the first wireless communication interface unit 106.

The data remaining amount prediction unit 102h, on the basis of the data amount of the communication data having high priority divided by the data division unit 102c, predicts a data remaining amount capable of being transmitted to the second communication device 200 via the first wired communication interface unit 104. The data amount determination unit 102i determines whether the data amount of the communication data having low priority divided by the data division unit 102c is smaller than the data remaining amount predicted by the data remaining amount prediction unit 102h.

When it is determined by the data amount determination unit 102i that the data amount of the communication data having low priority is smaller than the data remaining amount predicted by the data remaining amount prediction unit 102h, the wired communication data generation unit 102d may generate both the communication data having high priority and the communication data having low priority divided by the data division unit 102c as the wired communication data.

When it is determined by the data amount determination unit 102i that the data amount of the communication data having low priority is the data remaining amount predicted by the data remaining amount prediction unit 102h or larger, the data division unit 102c may redivide the communication data having low priority so as to contain part of the communication data having low priority in addition to the communication data having high priority until a data amount corresponding to the data remaining amount is reached. The wired communication data generation unit 102d may add part of the communication data having low priority redivided by the data division unit 102c to the communication data having high priority to be generated as the wired communication data. Further, the wireless communication data generation unit 102f may generate the rest of the communication data having low priority not added to the communication data having high priority when redivided by the data division unit 102c as the wireless communication data.

The wired reception controller 102j receives the wired communication data transmitted by a wired transmission controller 202e from the second communication device 200 via the first wired communication interface unit 104. The wireless reception controller 102k receives the wireless communication data transmitted by a wireless transmission controller 202g from the second communication device 200 via the first wireless communication interface unit 106. The reception data priority identification unit 102m identifies the priority corresponding to each of the wired communication data received by the wired reception controller 102j and the wireless communication data received by the wireless reception controller 102k by referring to the data priority information stored in the data priority information table 108a as the data priority information storage unit of the first communication device 100. The data coupling unit 102n, on the basis of the priority of the wired communication data and the priority of the wireless communication data identified by the reception data priority identification unit 102m, couples the wired communication data and the wireless communication data to each other to reconstruct the communication data.

The following describes the details of the controller 202 of the second communication device 200 with reference to FIG. 4. In FIG. 4, the controller 202 includes a data type determination unit 202a, a transmission data priority identification unit 202b, a data division unit 202c, a wired communication data generation unit 202d, the wired transmission controller 202e, a wireless communication data generation unit 202f, the wireless transmission controller 202g, a data remaining amount prediction unit 202h, a data amount determination unit 202i, a wired reception controller 202j, a wireless reception controller 202k, a reception data priority identification unit 202m, and a data coupling unit 202n. In the embodiment, the first communication device 100 and the second communication device 200 are basically the same in terms of function.

Among them, the data type determination unit 202a determines the type of communication data to be transmitted from the second communication device 200 to the first communication device 100. The transmission data priority identification unit 202b refers to data priority information stored in the data priority information table 208a (refer to FIG. 5) as a data priority information storage unit of the second communication device 200 and identifies priority corresponding to the type of the communication data determined by the data type determination unit 202a. The data division unit 202c, on the basis of the priority identified by the transmission data priority identification unit 202b, divides pieces of communication data into communication data having high priority and communication data having low priority.

The wired communication data generation unit 202d generates the communication data having high priority divided by the data division unit 202c as wired communication data communicable in a wired manner. The wired transmission controller 202e transmits the wired communication data generated by the wired communication data generation unit 202d to the first communication device 100 via the second wired communication interface unit 204. In this case, the wired transmission controller 202e transmits the wired communication data generated by the wired communication data generation unit 102d to the second communication device 200 by the electric communication by an electric signal or the optical communication by an optical signal via the first wired communication interface unit 104. The wireless communication data generation unit 202f generates the communication data having low priority divided by the data division unit 202c as wireless communication data communicable in a wireless manner. The wireless transmission controller 202g transmits the wireless communication data generated by the wireless communication data generation unit 202f to the first communication device 100 via the second wireless communication interface unit 206.

The data remaining amount prediction unit 202h, on the basis of the data amount of the communication data having high priority divided by the data division unit 202c, predicts a data remaining amount capable of being transmitted to the first communication device 100 via the second wired communication interface unit 204. The data amount determination unit 202i determines whether the data amount of the communication data having low priority divided by the data division unit 202c is smaller than the data remaining amount predicted by the data remaining amount prediction unit 202h.

When it is determined by the data amount determination unit 202i that the data amount of the communication data having low priority is smaller than the data remaining amount predicted by the data remaining amount prediction unit 202h, the wired communication data generation unit 202d may generate both the communication data having high priority and the communication data having low priority divided by the data division unit 202c as the wired communication data.

When it is determined by the data amount determination unit 202i that the data amount of the communication data having low priority is the data remaining amount predicted by the data remaining amount prediction unit 202h or larger, the data division unit 202c may redivide the communication data having low priority so as to contain part of the communication data having low priority in addition to the communication data having high priority until a data amount corresponding to the data remaining amount is reached. The wired communication data generation unit 202d may generate the communication data having high priority and part of the communication data having low priority redivided by the data division unit 202c as the wired communication data. Further, the wireless communication data generation unit 202f may generate the rest of the communication data having low priority not added to the communication data having high priority when redivided by the data division unit 202c as the wireless communication data.

The wired reception controller 202j receives the wired communication data transmitted by the wired transmission controller 102e from the first communication device 100 via the second wired communication interface unit 204. The wireless reception controller 202k receives the wireless communication data transmitted by the wireless transmission controller 102g from the first communication device 100 via the second wireless communication interface unit 206. The reception data priority identification unit 202m identifies the priority corresponding to each of the wired communication data received by the wired reception controller 202j and the wireless communication data received by the wireless reception controller 202k by referring to the data priority information stored in the data priority information table 208a as the data priority information storage unit of the second communication device 200. The data coupling unit 202n, on the basis of the priority of the wired communication data and the priority of the wireless communication data identified by the reception data priority identification unit 202m, couples the wired communication data and the wireless communication data to each other to reconstruct the communication data.

The following describes an example of a wired/wireless composite communication method executed by the wired/wireless composite communication system 1 of the embodiment configured as described above with reference to FIG. 6.

As illustrated in FIG. 6, the data type determination unit 102a of the first communication device 100 determines the type of communication data input in order to be transmitted from the first communication device 100 to the second communication device 200. The transmission data priority identification unit 102b of the first communication device 100 refers to the data priority information stored in the data priority information table 108a of the first communication device 100 and identifies the priority corresponding to the type of the communication data determined by the data type determination unit 102a. The data division unit 102c of the first communication device 100, on the basis of the priority identified by the transmission data priority identification unit 102b, divides pieces of communication data into the communication data having high priority and the communication data having low priority (Step S101).

These pieces of processing at Step S101 by the data type determination unit 102a, the transmission data priority identification unit 102b, and the data division unit 102c of the first communication device 100 are data type determination and division processing to achieve a highly-reliable communication system that transmits important signals by wired communication. Although an example performed referring to the data priority information table 108a (an ID map) illustrated in FIG. 5 has been described for the processing at this Step S101, the data priority information table 108a is an example of the data priority information storage unit; in addition, the data priority information may be information described below. In the data priority information, the communication data having high priority for use in the wired communication may contain a security signal, whereas the communication data having low priority for use in the wireless communication may contain a data signal, for example. Examples of the security signal include an encryption key and an ID. The data signal is a data main body encrypted by the encryption key of the security signal or a data main body with the ID of the security signal added. In the data priority information, the communication data having high priority for use in the wired communication may contain signals of high importance in the control of the vehicle 10, whereas the communication data having low priority for use in the wireless communication may contain signals of low importance in the control of the vehicle 10. Examples of the signals of high importance include signals about the safety-related device group and the power train-related device group. Examples of the signals of low importance include signals about the multimedia-related device group and the diagnosis-related device group. In the data priority information, the communication data having high priority for use in the wired communication may contain important signals about the control of the vehicle 10, whereas the communication data having low priority for use in the wireless communication may contain all signals about the control of the vehicle 10. Examples of important signals include signals that must be made redundant (signals about the safety-related device group, for example). All signals are signals about the body-related device group, the safety-related device group, the power train-related device group, the multimedia-related device group, the power supply-related device group, the diagnosis-related device group, and the charging-related device group. In the data priority information, the communication data having high priority for use in the wired communication may contain a control signal, whereas the communication data having low priority for use in the wireless communication may contain a data signal. Examples of control signal include signals about the control of the vehicle 10. The data signal is a data main body to which instruction contents are added by the control signal.

In addition, the pieces of processing at Step S101 are data type determination and division processing to achieve a communication system that transmits signals for which delay times must be shortened by wired signals and transmits signals for which some delay times can be permitted by the wireless communication. The data priority information in this case may be information described below. In the data priority information, the communication data having high priority for use in the wired communication may contain a control signal, whereas the communication data having low priority for use in the wireless communication may contain a data signal, for example. In the data priority information, the communication data having high priority for use in the wired communication may contain signals for which the delay times must be shortened among the signals about the safety-related device group, whereas the communication data having low priority for use in the wireless communication may contain signals for which some delay times can be permitted among the signals about the safety-related device group. Examples of the signals for which the delay times must be shortened among the signals about the safety-related device group include thinned information of camera images for short-distance obstacle detection. Examples of the signals for which some delay times can be permitted among the signals about the safety-related device group include full information of camera images for long-distance obstacle detection.

Referring back to FIG. 6, for the communication data determined to be used using wired communication and is divided in the processing at Step S101, the wired communication data generation unit 102d of the first communication device 100 generates the communication data having high priority divided by the data division unit 102c at Step S101 as the communication data communicable in a wired manner (Step S102). The wired transmission controller 102e of the first communication device 100 transmits the wired communication data generated by the wired communication data generation unit 102d at Step S102 to the second communication device 200 via the first wired communication interface unit 104 (Step S104). The wired transmission controller 102e, at Step S104, transmits the wired communication data generated by the wired communication data generation unit 102d at Step S102 to the second communication device 200 by the electric communication by an electric signal or the optical communication by an optical signal via the first wired communication interface unit 104 in accordance with the type of the communication data determined by the data type determination unit 102a at Step S101, for example. In this case, the wired transmission controller 102e transmits wired communication data relatively large in information amount to the second communication device 200 by the optical communication by an optical signal via the first wired communication interface unit 104, for example. The wired transmission controller 102e transmits wired communication data relatively small in information amount to the second communication device 200 by the electric communication by an electric signal via the first wired communication interface unit 104, for example. Alternatively, the wired transmission controller 102e, at Step S104, may transmit the wired communication data generated by the wired communication data generation unit 102d at Step S102 to the second communication device 200 by the electric communication by an electric signal or the optical communication by an optical signal via the first wired communication interface unit 104 in accordance with the priority identified by the transmission data priority identification unit 102b at Step S101, for example. In this case, the wired transmission controller 102e transmits wired communication data relatively high in the identified priority to the second communication device 200 by the optical communication by an optical signal via the first wired communication interface unit 104, for example. The wired transmission controller 102e transmits wired communication data relatively low in the identified priority to the second communication device 200 by the electric communication by an electric signal via the first wired communication interface unit 104, for example. The wired transmission controller 102e, at Step S104, may transmit the wired communication data generated by the wired communication data generation unit 102d at Step S102 to the second communication device 200 via the first wired communication interface unit 104 by using the data communication using the electric communication in a wired manner or the data communication using the optical communication in a wired manner as appropriate depending on the situation regardless of the type of the communication data, the priority, or the like, for example.

The wired reception controller 202j of the second communication device 200 receives the wired communication data transmitted by the wired transmission controller 102e from the first communication device 100 at Step S104 via the second wired communication interface unit 204 (Step S106). Subsequently, the process shifts to the processing at Step S108.

In contrast, for the communication data determined to be use using the wireless communication and is divided in the processing at Step S101, the wireless communication data generation unit 102f of the first communication device 100 generates the communication data having low priority divided by the data division unit 102c at Step S101 as the wireless communication data communicable in a wireless manner (Step S103). The wireless transmission controller 102g of the first communication device 100 transmits the wireless communication data generated by the wireless communication data generation unit 102f at Step S103 to the second communication device 200 via the first wireless communication interface unit 106 (Step S105).

The wireless reception controller 202k of the second communication device 200 receives the wireless communication data transmitted by the wireless transmission controller 102g from the first communication device 100 at Step S105 via the second wireless communication interface unit 206 (Step S107). Subsequently, the process shifts to the processing at Step S108.

The reception data priority identification unit 202m of the second communication device 200 identifies the priority corresponding to each of the wired communication data received by the wired reception controller 202j at Step S106 and the wireless communication data received by the wireless reception controller 202k at Step S107 by referring to the data priority information stored in the data priority information table 208a as the data priority information storage unit of the second communication device 200. The data coupling unit 202n of the second communication device 200, on the basis of the priority of the wired communication data and the priority of the wireless communication data identified by the reception data priority identification unit 202m, couples the wired communication data and the wireless communication data to each other to reconstruct the communication data (Step S108). At Step S108, the controller 202 may perform determination about whether there are no abnormalities in the reconstructed communication data and the like. Subsequently, the communication data is output and this processing is ended.

The following describes the details of another example of the wired/wireless composite communication method executed by the wired/wireless composite communication system 1 with reference to FIG. 7.

As illustrated in FIG. 7, the data type determination unit 102a of the first communication device 100 determines the type of communication data input in order to be transmitted from the first communication device 100 to the second communication device 200. The transmission data priority identification unit 102b of the first communication device 100 refers to the data priority information stored in the data priority information table 108a of the first communication device 100 and identifies the priority corresponding to the type of the communication data determined by the data type determination unit 102a. The data division unit 102c, on the basis of the priority identified by the transmission data priority identification unit 102b, divides pieces of communication data into the communication data having high priority and the communication data having low priority (Step S201)

In the processing at Step S201, for the communication data having high priority determined to be used using wired communication and then divided, the data remaining amount prediction unit 102h of the first communication device 100, on the basis of a data amount (in FIG. 7, data amount: D0) of the communication data having high priority divided by the data division unit 102c at Step S201, predicts a data remaining amount (in FIG. 7, data amount: DA) capable of being transmitted to the second communication device 200 via the first wired communication interface unit 104 (Step S202). Information on the data remaining amount (data amount: DA) capable of being transmitted to the second communication device 200 predicted at Step S202 is used in determination processing at Step S203.

For the communication data having low priority determined to be used using the wireless communication and then divided in the processing at Step S201, the data amount determination unit 102i of the first communication device 100 determines whether a data amount (in FIG. 7, data amount: D1) of the communication data having low priority divided by the data division unit 102c at Step S201 is smaller than the data remaining amount (data amount: DA) predicted by the data remaining amount prediction unit 102h (Step S203).

When it is determined that the data amount (data amount: D1) of the communication data having low priority is smaller than the data remaining amount (data amount: DA) (DA>D1) in the processing by the data amount determination unit 102i at Step S203, the wired communication data generation unit 102d of the first communication device 100 performs processing at Step S206 as processing to perform data communication using only the wired communication. Specifically, the wired communication data generation unit 102d of the first communication device 100 generates both the communication data having high priority (data amount: D0) and the communication data having low priority (data amount: D1) divided by the data division unit 102c at Step S201 as the wired communication data (Step S206). The wired transmission controller 102e of the first communication device 100 transmits the wired communication data generated by the wired communication data generation unit 102d at Step S206 to the second communication device 200 via the first wired communication interface unit 104 (Step S207). Also in this case similarly to the above, the wired transmission controller 202e transmits the wired communication data generated by the wired communication data generation unit 102d to the second communication device 200 by the electric communication by an electric signal or the optical communication by an optical signal via the first wired communication interface unit 104. The wired reception controller 202j of the second communication device 200 receives the wired communication data transmitted by the wired transmission controller 102e from the first communication device 100 at Step S207 via the second wired communication interface unit 204 (Step S210). Subsequently, the process shifts to the processing at Step S212, in which when the data communication is performed using only the wired communication, a mark bit described below is not added to the wired communication data, and the processing at Step S212 is skipped, and the process shifts to the processing at Step S214. When the data communication is performed using only the wired communication, the controller 202 of the second communication device 200, without performing data coupling of the communication data having high priority (data amount: D0) and the communication data having low priority (data amount: D1) contained in the wired communication data, performs determination about whether there are no abnormalities in the communication data and the like. Subsequently, the data is output and this processing is ended.

Referring back to the processing at Step S203, when it is determined that the data amount (data amount: D1) of the communication data having low priority is the data amount (data amount: DA) or larger (DA≤D1) in the processing by the data amount determination unit 102i, the wired communication data generation unit 102d of the first communication device 100 performs processing at Step S204 as processing to perform data communication using both the wired communication and the wireless communication. Specifically, the data division unit 102c of the first communication device 100 redivides the communication data having low priority (data amount: D1) divided at Step S201 so as to contain part of the communication data having low priority (data amount: DA−D0=D1) in addition to the communication data having high priority (data amount: D0) until a data amount corresponding to the data remaining amount (data amount: DA) is reached (D0+D1=DA) (Step S204). Subsequently, the controller 102 of the first communication device 100 imparts a mark bit to communication data for the wired communication (data amount: DA) containing part of the communication data having low priority (data amount: DA−D0=D1) redivided by the data division unit 102c at Step S204 (Step S205). For example, the controller 102 imparts a mark bit to a position where the communication data is redivided in order for part of the communication data having low priority, which was communication data for the wireless communication in the processing at Step S201, to be added to the communication data for the wired communication. This mark bit is used when the communication data is subjected to data coupling on the reception side. Subsequently, the process shifts to the processing at Step S206.

When the data communication is thus performed by using both the wired communication and the wireless communication, the wired communication data generation unit 102d of the first communication device 100 generates part of the communication data having low priority (data amount: DA−D0=D1) redivided by the data division unit 102c at Step S204 as the wired communication data (data amount: DA) in addition to the communication data having high priority (data amount: D0) divided at Step S201 (Step S206). The wired transmission controller 102e of the first communication device 100 transmits the wired communication data generated by the wired communication data generation unit 102d at Step S206 to the second communication device 200 via the first wired communication interface unit 104 (Step S207). The wired reception controller 202j of the second communication device 200 receives the wired communication data transmitted by the wired transmission controller 102e from the first communication device 100 at Step S207 via the second wired communication interface unit 204 (Step S210). Subsequently, the process shifts to the processing at Step S212.

The controller 202 of the second communication device 200 extracts data to be recoupled to the wireless communication data received at Step S211 (that is, the redivided data added to the wired communication data at Step S206) on the basis of the mark bit imparted to the wired communication data received by the wired reception controller 202j at Step S210 (Step S212). Subsequently, the process shifts to the processing at Step S213.

After the processing at Step S204, the wireless communication data generation unit 102f of the first communication device 100 generates the rest of the communication data having low priority not added to the communication data having high priority when redivided by the data division unit 102c at Step S204 as the wireless communication data (Step S208). The wireless transmission controller 102g of the first communication device 100 transmits the wireless communication data generated by the wireless communication data generation unit 102f at Step S208 to the second communication device 200 via the first wireless communication interface unit 106 (Step S209). The wireless reception controller 202k of the second communication device 200 receives the wireless communication data transmitted by the wireless transmission controller 102g from the first communication device 100 at Step S209 via the second wireless communication interface unit 206 (Step S211). Subsequently, the process shifts to the processing at Step S213.

The data coupling unit 202n of the second communication device 200 couples the data remaining when redivided at Step S204 and the redivided data extracted at Step S212 to each other (Step S213). Specifically, the data coupling unit 202n of the second communication device 200 couples the wireless communication data received by the wireless reception controller 202k at Step S211 and part of the communication data having low priority extracted from the wired communication data at Step S212 to each other. The data coupling unit 202n of the second communication device 200 couples the residual communication data having high priority not extracted from the wired communication data at Step S212 and the communication data having low priority recoupled at Step S213 to each other (Step S214). At Step S214, the controller 202 may perform determination about whether there are no abnormalities in the reconstructed communication data and the like. Subsequently, the communication data is output and this processing is ended.

Thus, in the processing illustrated in FIG. 7, a communication system is achieved that basically performs the data communication by the wired communication and complements the wired communication by the wireless communication when the data amount overflows. Use of the wired communication or the wireless communication in this case can be considered separately as follows. Examples of objects for which the data communication is performed by the wired communication include voice signals such as the radio, video signals such as the one-segment TV, and video signals corresponding to part of the full-segment TV and the like among the communication data about the multimedia-related device group. In this case, examples of objects for which the data communication is performed by the wireless communication include video signals corresponding to the rest of the full-segment TV and the like among the communication data about the multimedia-related device group. In addition, for update software of an ECU and download data of map data and the like for navigation, the data communication is basically performed by the wired communication, and when the data amount overflows, the wireless communication may complement the wired communication.

As described above, the wired/wireless composite communication system 1 and the wired/wireless composite communication method according to the embodiment can perform control to use the wired communication for the communication data having high priority among the types of the communication data transmitted and received between the communication devices provided within the vehicle and to use the wireless communication for the communication data having low priority. With this control, the need to connect all the communication devices provided within the vehicle with expensive communication lines enabling large-capacity data communication in order to improve the reliability of the data communication is eliminated, and the communication lines within the vehicle can be simplified while ensuring the reliability of the data communication. Consequently, when various pieces of communication data are transmitted and received between the communication devices provided within the vehicle by the wired/wireless composite communication, the wired communication can be made inexpensive while improving the reliability of the data communication. Further, the wired/wireless composite communication system 1 and the wired/wireless composite communication method can use both the electric communication by the electric signal and the optical communication by the optical signal as communication in a wired manner, that is, the wired communication. Thus, the wired/wireless composite communication system 1 and the wired/wireless composite communication method according to the embodiment can appropriately transmit and receive various pieces of communication data between the communication devices provided within the vehicle by the wired/wireless composite communication.

Although the present invention has been described on the basis of the embodiment, the embodiment does not limit the present invention; alterations may be added without departing from the gist of the present invention, and other techniques may be combined as appropriate to the practicable extent.

Although the first communication device and the second communication device have the same function in the above description, for example, this is not limiting; either the first communication device or the second communication device may have functions required by a transmission-side communication device, whereas the other may have functions required by a reception-side communication device. Examples of the functions required by the transmission-side communication device include functions by a data type determination unit, a transmission data priority identification unit, a data division unit, a wired communication data generation unit, a wired transmission controller, a wireless communication data generation unit, a wireless transmission controller, a data remaining amount prediction unit, and a data amount determination unit. Examples of the functions required by the reception-side communication device include functions by a wired reception controller, a wireless reception controller, a reception data priority identification unit, and a data coupling unit.

A wired/wireless composite communication system and a wired/wireless composite communication method according to the embodiment can perform control to use wired communication for communication data high in priority among the types of communication data transmitted and received between communication devices provided within a vehicle and to use wireless communication for communication data having low priority. In this process, the wired/wireless composite communication system and the wired/wireless composite communication method can use electric communication by an electric signal and optical communication by an optical signal as communication in a wired manner, that is, wired communication. With this control, wired/wireless composite communication can appropriately transmit and receive various pieces of communication data between the communication devices provided within the vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wired/wireless composite communication system comprising:
  a first communication device including a controller, a storage unit, a first wired communication interface unit, and a first wireless communication interface unit; and
  a second communication device communicably connected to the first communication device in a wired manner and a wireless manner and including a controller, a storage unit, a second wired communication interface unit, and a second wireless communication interface unit, a communication in the wired manner including an electric communication by an electric signal and an optical communication by an optical signal, wherein
  the storage unit of the first communication device and the storage unit of the second communication device each includes a data priority information storage unit that stores therein data priority information that sets priority for each type of communication data transmitted and received between the first communication device and the second communication device provided within a vehicle,
  the controller of the first communication device includes:
    a data type determination unit that determines a type of the communication data to be transmitted from the first communication device to the second communication device;
    a transmission data priority identification unit that identifies the priority corresponding to the type of the communication data determined by the data type determination unit by referring to the data priority information stored in the data priority information storage unit of the first communication device;
    a data division unit that, on the basis of the priority identified by the transmission data priority identification unit, divides pieces of communication data into communication data having high priority and communication data having low priority;
    a wired communication data generation unit that generates the communication data having high priority determined by the data division unit as wired communication data communicable in the wired manner;
a wired transmission controller that transmits the wired communication data generated by the wired communication data generation unit to the second communication device via the first wired communication interface unit;
a wireless communication data generation unit that generates the communication data having low priority determined by the data division unit as wireless communication data communicable in the wireless manner; and
a wireless transmission controller that transmits the wireless communication data generated by the wireless communication data generation unit to the second communication device via the first wireless communication interface unit, and
the controller of the second communication device includes:
a wired reception controller that receives the wired communication data transmitted by the wired transmission controller from the first communication device via the second wired communication interface unit;
a wireless reception controller that receives the wireless communication data transmitted by the wireless transmission controller from the first communication device via the second wireless communication interface unit;
a reception data priority identification unit that identifies the priority corresponding to each of the wired communication data received by the wired reception controller and the wireless communication data received by the wireless reception controller by referring to the data priority information stored in the data priority information storage unit of the second communication device; and
a data coupling unit that, on the basis of the priority of the wired communication data and the priority of the wireless communication data identified by the reception data priority identification unit, couples the wired communication data and the wireless communication data to each other to reconstruct the communication data.

2. The wired/wireless composite communication system according to claim 1, wherein
the controller of the first communication device further includes:
a data remaining amount prediction unit that predicts a data remaining amount capable of being transmitted to the second communication device via the first wired communication interface unit on the basis of a data amount of the communication data having high priority determined by the data division unit; and
a data amount determination unit that determines whether a data amount of the communication data having low priority determined by the data division unit is smaller than the data remaining amount predicted by the data remaining amount prediction unit, and
when it is determined by the data amount determination unit that the data amount of the communication data having low priority is smaller than the data remaining amount predicted by the data remaining amount prediction unit, the wired communication data generation unit generates both the communication data having high priority and the communication data having low priority determined by the data division unit as the wired communication data.

3. The wired/wireless composite communication system according to claim 2, wherein
when it is determined by the data amount determination unit that the data amount of the communication data having low priority is the data remaining amount predicted by the data remaining amount prediction unit or larger, the data division unit redetermines the communication data having low priority so as to contain part of the communication data having low priority in addition to the communication data having high priority until a data amount corresponding to the data remaining amount is reached,
the wired communication data generation unit adds the part of the communication data having low priority redetermined by the data division unit to the communication data having high priority to be generated as the wired communication data, and
the wireless communication data generation unit generates the rest of the communication data having low priority not added to the communication data having high priority when redetermined by the data division unit as the wireless communication data.

4. The wired/wireless composite communication system according to claim 3, wherein
the wired transmission controller transmits the wired communication data generated by the wired communication data generation unit to the second communication device by the electric communication by the electric signal or the optical communication by the optical signal via the first wired communication interface unit in accordance with the type of the communication data determined by the data type determination unit or the priority identified by the transmission data priority identification unit.

5. The wired/wireless composite communication system according to claim 2, wherein
the wired transmission controller transmits the wired communication data generated by the wired communication data generation unit to the second communication device by the electric communication by the electric signal or the optical communication by the optical signal via the first wired communication interface unit in accordance with the type of the communication data determined by the data type determination unit or the priority identified by the transmission data priority identification unit.

6. The wired/wireless composite communication system according to claim 1, wherein
the wired transmission controller transmits the wired communication data generated by the wired communication data generation unit to the second communication device by the electric communication by the electric signal or the optical communication by the optical signal via the first wired communication interface unit in accordance with the type of the communication data determined by the data type determination unit or the priority identified by the transmission data priority identification unit.

7. A wired/wireless composite communication method executed by a wired/wireless composite communication system including a first communication device including a controller, a storage unit, a first wired communication interface unit and a first wireless communication interface unit, and a second communication device communicably connected to the first communication device in a wired manner and a wireless manner and including a controller, a storage unit, a second wired communication interface unit and a second wireless communication interface unit, a communication in the wired manner including an electric communication by an electric signal and an optical communication by an optical signal, the storage unit of the first communication device and the storage unit of the second communication device each including a data priority information storage unit that stores therein data priority information that sets priority for each type of communication data transmitted and received between the first communication device and the second communication device provided within a vehicle, the method comprising:

a data type determination step of determining a type of the communication data to be transmitted from the first communication device to the second communication device, executed by the controller of the first communication device;

a transmission data priority identification step of identifying the priority corresponding to the type of the communication data determined at the data type determination step by referring to the data priority information stored in the data priority information storage unit of the first communication device, executed by the controller of the first communication device;

a data division step of, on the basis of the priority identified at the transmission data priority identification step, dividing pieces of communication data into communication data having high priority and communication data having low priority, executed by the controller of the first communication device;

a wired communication data generation step of generating the communication data having high priority determined at the data division step as wired communication data communicable in the wired manner, executed by the controller of the first communication device;

a wireless communication data generation step of generating the communication data having low priority determined at the data division step as wireless communication data communicable in the wireless manner, executed by the controller of the first communication device;

a wired transmission control step of transmitting the wired communication data generated at the wired communication data generation step to the second communication device via the first wired communication interface unit, executed by the controller of the first communication device;

a wired reception control step of receiving the wired communication data transmitted at the wired transmission control step from the first communication device via the second wired communication interface unit, executed by the controller of the second communication device;

a wireless transmission control step of transmitting the wireless communication data generated at the wireless communication data generation step to the second communication device via the first wireless communication interface unit, executed by the controller of the first communication device;

a wireless reception control step of receiving the wireless communication data transmitted at the wireless transmission control step from the first communication device via the second wireless communication interface unit, executed by the controller of the second communication device;

a reception data priority identification step of identifying the priority corresponding to each of the wired communication data received at the wired reception control step and the wireless communication data received at the wireless reception control step by referring to the data priority information stored in the data priority information storage unit of the second communication device, executed by the controller of the second communication device; and a data coupling step of, on the basis of the priority of the wired communication data and the priority of the wireless communication data identified at the reception data priority identification step, coupling the wired communication data and the wireless communication data to each other to reconstruct the communication data.

8. The wired/wireless composite communication method according to claim 7, further comprising:

a data remaining amount prediction step of predicting a data remaining amount capable of being transmitted to the second communication device via the first wired communication interface unit on the basis of a data amount of the communication data having high priority determined at the data division step, executed by the controller of the first communication device; and a data amount determination step of determining whether a data amount of the communication data having low priority determined at the data division step is smaller than the data remaining amount predicted at the data remaining amount prediction step, executed by the controller of the first communication device, wherein at the wired communication data generation step, when it is determined, at the data amount determination step, that a data amount of the communication data having low priority is smaller than the data remaining amount predicted at the data remaining amount prediction step, both the communication data having high priority and the communication data having low priority determined at the data division step are generated as the wired communication data.

9. The wired/wireless composite communication method according to claim 8, wherein at the data division step, when it is determined, at the data amount determination step, that the data amount of the communication data having low priority is the data remaining amount predicted at the data remaining amount prediction step or larger, the communication data having low priority is redetermined so as to contain part of the communication data having low priority in addition to the communication data having high priority until a data amount corresponding to the data remaining amount is reached, at the wired communication data generation step, the part of the communication data having low priority redetermined at the data division step is added to the communication data having high priority to be generated as the wired communication data, and at the wireless communication data generation step, the rest of the communication data having low priority not added to the communication data having high priority when redetermined at the data division step is generated as the wireless communication data.

10. The wired/wireless composite communication method according to claim 9, wherein at the wired transmission control step, the wired communication data generated at the wired communication data generation step is transmitted to the second communication device by the electric communication by the electric signal or the optical communication by the optical signal via the first wired communication interface unit in accordance with the type of the communication data determined at the data type determination step or the priority identified at the transmission data priority identification step.

11. The wired/wireless composite communication method according to claim 8, wherein
at the wired transmission control step, the wired communication data generated at the wired communication data generation step is transmitted to the second communication device by the electric communication by the electric signal or the optical communication by the optical signal via the first wired communication interface unit in accordance with the type of the communication data determined at the data type determination step or the priority identified at the transmission data priority identification step.

12. The wired/wireless composite communication method according to claim 7, wherein
at the wired transmission control step, the wired communication data generated at the wired communication data generation step is transmitted to the second communication device by the electric communication by the electric signal or the optical communication by the optical signal via the first wired communication interface unit in accordance with the type of the communication data determined at the data type determination step or the priority identified at the transmission data priority identification step.

* * * * *